United States Patent Office 3,658,827
Patented Apr. 25, 1972

---

3,658,827
SOLUBLE BENZIMIDAZOLE DERIVATIVES USABLE AS FUNGICIDES
Louis Alain Michel Marc Bezou, Dijon, France, assignor to Compagnie Chimique Merck Sharp & Dohme, S.A.
No Drawing. Continuation of application Ser. No. 649,029, June 26, 1967. This application June 15, 1970, Ser. No. 48,894
Int. Cl. C07d 99/10
U.S. Cl. 260—302 H                    2 Claims

ABSTRACT OF THE DISCLOSURE

Lactates of 2-R-benzimidazoles, in which R is an aromatic radical, a penta-atomic heterocyclic radical containing 1–3 heterocyclic atoms or a hexa-atomic heterocyclic radical or a condensed cyclic radical, are salts which are soluble in water in any proportion and which show a fungicidal activity.

DESCRIPTION OF THE INVENTION

This is a continuation of Ser. No. 649,029, filed June 26, 1967, and now abandoned.

This invention relates to compounds which are active as fungicides and which are highly soluble in water. The invention also relates to a process for the preparation of these soluble compounds from known compounds.

The compounds from which the soluble compounds according to the invention are derived, are benzimidazoles which are substituted in the 2-position and which in particular correspond to the formula 2-R-benzimidazole, in which R is an aromatic radical, a penta-atomic heterocyclic radical containing 1–3 heterocyclic atoms, or even a hexa-atomic heterocyclic radical or a condensed cyclic radical. In other words, these compounds correspond to the general formula (I) 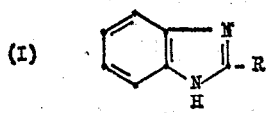

in which R is as defined above and accordingly may represent a phenyl-, alkyl(lower)phenyl-, halogenphenyl-, nitrophenyl-, alkoxy(lower)phenyl-, hydroxyphenyl-, naphthyl- or even any other optionally substituted aryl radical, or a penta-atomic heterocyclic radical containing 1–3 heterocyclic atoms, such as furyl, chlorofuryl, thienyl, pyrryl, thiazolyl, isothiazolyl or thiadiazolyl, a hexa-atomic heterocyclic radical such as pyranyl, pyrazinyl or pyridyl, or even a condensed cyclic radical such as quinolinyl, isoquinolinyl, coumarinyl or thiacoumarinyl.

The preferred soluble compounds of the invention are derived from benzimidazoles of Formula I wherein R is a thiazolyl, phenyl or furyl radical.

The benzimidazoles substituted in the 2-position from which the soluble compounds of the invention are derived, may if desired also carry other substituents on the nucleus of the benzimidazole, in particular at the 5 and/or 6-position of this nucleus. These substituted benzimidazoles correspond to the following formula (II) 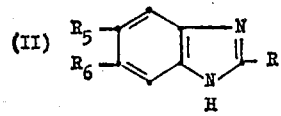

in which R is as defined above and, in particular, represents a phenyl-, halogenphenyl-, nitrophenyl-, alkoxy(lower)phenyl-, hydroxyphenyl-, alkyl(lower)phenyl-, naphthyl-, furyl-, chlorofuryl-, pyrryl-, thienyl-, thiazolyl-, isothiazolyl-, thiadiazolyl-, pyranyl-, pyridyl-, quinolinyl-, isoquinolinyl-, coumarinyl- or thiacoumarinyl-; $R_5$ represents a hydrogen atom or a lower alkyl radical, a halogen atom, an amino-, phenyl-, phenoxy- or alkoxy(lower) phenyl radical, and $R_6$ represents hydrogen or a lower alkyl radical.

Examples of benzimidazoles from which are made compounds falling within the scope of the present invention are 2-(2'-thienyl)-benzimidazole,
2-phenylbenzimidazole,
2-(2'-fluorophenyl)-benzimidazole,
2-(2'-naphthyl)-benzimidazole,
2-(2'-furyl)-benzimidazole,
2-(2'-pyrryl)-benzimidazole,
2-(3'-thienyl)-benzimidazole,
2-(4'-thiazolyl)-benzimidazole,
2-(2'-thiazolyl)-benzimidazole
2-(2'-thienyl)-5-(4'-chlorophenyl)-benzimidazole,
2-(3'-thiacoumarinyl)-benzimidazole,
2-(3'-tolyl)-benzimidazole,
2-(2'-thienyl)-benzimidazole,
2,5-diphenylbenzimidazole,
2-(2'-chlorophenyl)-benzimidazole,
2-(2'-furyl)-5-chlorobenzimidazole,
2-(2'-thienyl)-5-aminobenzimidazole,
2-(2'-methoxyphenyl)-benzimidazole,
2-(6'-coumarinyl)-benzimidazole,
2-(2'-pyrryl)-5-aminobenzimidazole,
2-(2'-furyl)-5,6-dimethylbenzimidazole,
2-[3'-(1,2,5-thiadiazolyl)]-benzimidazole,
2-(4'-thiazolyl)-5-aminobenzimidazole and
2-pyrazinylbenzimidazole.

These various benzimidazoles substituted in the 2-position may be used as fungicides, in particular for inhibiting the growth of Aspergillus strains, for example *A. niger, A. flavus* and *A. orygae,* Penicillium strains for example *P. italicum, P. expansum, P. digitatum* and *P. roqueforti, Cercospora feticola* and *Saccharomyces* strains such as *S. corevisiae, S. fragilis* and *S. lactis.*

Most of the fungicidal compounds, however, and particularly the preferred, compounds such as 2-(4'-thiazolyl)-benzimidazole, are sparingly soluble or even essentially insoluble in conventional solvents, water in particular. Accordingly, they are generally used as solids in the form of finely divided powders and granular products, or as liquid formulations, in the form of emulsions, suspensions, emulsifiable concentrates, etc. For certain industrial applications, however, it is more convenient to use the fungicides in the form of solutions, particularly in an inexpensive solvent such as water.

Applicant has now found that a particular category of derivatives of benzimidazoles substituted in the two-position corresponding to the preceding Formulae I and II, are soluble in water and other solvents, and still show a fungicidal activity at least equal to that of the starting compounds.

The soluble derivatives according to the invention are formed by the reaction products of the benzimidazoles of Formula I or II with lactic acid.

Accordingly, the invention also relates to a process for the preparation of fungicidal products soluble in the usual solvents, water in particular comprising reacting a benzimidazole substituted in the 2-position corresponding to Formula I or II with lactic acid, optionally under moderate heat.

Experience has shown that the products obtained according to the invention are soluble in any proportion in the conventional solvents, for example water, methanol, ethanol, acetone, ethylacetate, tetrahydrofurfuryl alcohol, etc., at room temperature. In addition, it has been found that the fungicidal properties of these products are at least equal to those of the starting compounds, particularly as regards their effectiveness in inhibiting the growth of Aspergillus, Penicillium, Cercospora or Saccharomyces strains.

The lactates of the benzimidazole derivatives according to the invention may be obtained in the form of condensates in an excess of lactic acid and may be mixed with the solvent, water in particular, either directly before use or before being converted into any one of the industrial forms convenient for inhibiting the growth of fungi and in particular for protecting plants and plant products.

The benzimidazole derivatives substituted in the 2-position which form one of the reactants in the process according to the invention, are known compounds. Processes for the preparation of these compounds are described in particular in French Pat. No. 1,423,609 of Jan. 6, 1961, in French patent application which applicants filed on May 23, 1964 under No. PV 975,637, relating to "Fungicidal Compounds and Processes for Their Preparation" and in a French patent application which applicants filed on Aug. 5, 1965 under No. 27,405, relating to "The Use of Benzimidazoles as Fungicides."

The following non-limiting examples relating to a preferred compound, are intended to illustrate the invention. It is obvious that the application of these particular examples to the other compounds covered by the invention would not present any difficulty to persons of average ability in this art.

EXAMPLE I

The lactate of 2-(4'-thiazolyl)-benzimidazole is prepared from lactic acid which, owing to its lack of stability is concentrated form, is for the most part in the form of a mixture of lactic acid proper, lactyllactic acid and water, and from 2-(4'-thiazolyl)-benzimidazole which is a known compound corresponding to the formula

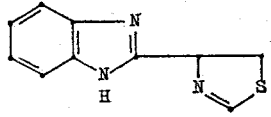

and which is present in the form of a powder.

90 g. (1 mol) of lactic acid are heated to between 40 and 50° C. and 200 g. (1 mol) of 2-(4'-thiazolyl)-benzimidadole introduced with stirring. Heating is continued until a clear, viscous solution is obtained.

The resulting solution is miscible in any proportion with water and with a certain number of other conventional organic solvents.

EXAMPLE II

Pure thiabendazole-lactic acid solution (I) and a formulation (II) containing surfactant are prepared in the same manner, except that for II, 1% surfactant replaces an equal weight of lactic acid and is added after thiabendazole has dissolved:

| | I—Pure solution | | | II—Surfactant formulation | | |
|---|---|---|---|---|---|---|
| | Percent | Lb. | Grams | Percent | Lb. | Grams |
| 2-(4'-thiazolyl)-benzimidazole | 25 | 1.50 | 681 | 25 | 1.50 | 681 |
| Lactic acid U.S.P. | 75 | 4.50 | 2,041 | 74 | 4.44 | 2,014 |
| Surfactant* | | | | 1 | 0.06 | 27 |

*E.g. Atlas TWEEN 80.

Thiabendazole and lactic acid are weighed into a four liter beaker. The beaker is placed on a steam bath and fitted with a mechanical stirrer. The mixture is warmed (max. 70° C.) with gentle agitation until solution is complete (20–30 minutes). When preparing the formulation (II), surfactant is added to the solution which is agitated for an additional five minutes. The warm solution is filtered through a coarse porosity, sintered glass funnel using minimum vacuum and is allowed to cool to room temperature for packaging.

Thiabendazole can be dissolved in lactic acid at room temperature, but the time required to achieve a 25% solution is considerably shortened by warming. Heating above 70° C., is not advised in order to prevent color build-up.

Any thiabendazole concentration can be prepared up to about 30% by weight. Somewhat higher concentrations (35%) may be obtained by excessive heating, but the solutions are supersaturated. When crystallization occurs from supersaturated solutions, the solid product is not pure thiabendazole, but is thiabendazole weakly bound with an equimolar amount of lactic acid. Crystallization takes place within a day or two from 30% solutions and has been observed in 25% solutions after seeding and long aging.

Thiabendazole-lactic acid solutions may be diluted with water to very low concentrations without precipitating the thiabendazole; e.g.: 0.1 and 0.25% solutions prepared by dilution with water are stable at room temperature. Dilution with a few volumes of water, however, will cause precipitation as will dilution wtih non-polar solvents.

To compare the degrees of solubility, the following salts of 2-(4'-thiazolyl)-benzimidazole were prepared:

(a) Hydrochloride.—For this purpose, 200 g. (1 mol) of 2-(4'-thiazolyl)-benzimidazole are dissolved in 1000 ml. of 10% hydrochloric acid at 80° C. The solution is filtered through active carbon and the filtrate left to cool to 20° C. It is then suction-filtered, washed with water acidified with 10% hydrochloric acid and then with demineralised water until its pH is greater than or equal to 4. After it has been suction-filtered, the product is dried in vacuo at 80° C.

(b) Citrate.—50 ml. of water are heated to 80° C. in a flask, 60 g. (0.31 mol) of citric acid being added with stirring. The acid is allowed to dissolve, after which 20 g. (0.1 mol) of 2-(4'-thiazolyl)-benzimidazole are introduced. The mixture is kept at 80° C. until the benzimidazole derivative has completely dissolved. The product is then left to cool to room temperature while stirring. It is suction-filtered and washed with 500 ml. of demineralised water. The product is then dried in vacuo at 50° C.

(c) Fumarate.—35 g. (approximately ⅓ mol) of fumaric acid are dissolved while stirring in 900 ml. of methanol heated to 30–35° C. 20 g. (0.1 mol) of 2-(4'-thiazolyl)-benzimidazole are then added. The product is heated to around 55° C. until the benzimidazole derivative is completely dissolved. The solution is filtered through carbon black, left to cool to 0° C., suction-filtered and washed with methanol, after which it is suction-filtered again. The product is dried in a vacuum oven at 60° C.

(d) Salicylate.—60 g. (0.43 mol) of salicylic acid are dissolved in 200 cc. of ethanol. 20 g. (0.1 mol) of 2-

(4′-thiazolyl)-benzimidazole are introduced and the mixture heated while stirring to around 65° C. until the benzimidazole derivative has completely dissolved. The solution is filtered through carbon black and cooled to room temperature. The product crystallises. It is suction-filtered and washed with a little ethanol and then dried in vacuum oven at 60° C.

The solubility of these various salts at 25° C. was determined in a certain number of conventional solvents. The results are set out in the following table:

| Solvent | Percent by weight of salt in relation to volume of solvent | | | | |
|---|---|---|---|---|---|
| | Hydrochloride | Citrate | Fumarate | Salicylate | Lactate |
| Methanol | 3.8 | 3.1 | 1.7 | 1.5 | Miscible in any proportion. |
| Ethanol | 2.0 | 1.2 | 1.6 | 0.7 | |
| Acetone | 1.0 | 4.0 | 0.3 | 0.6 | |
| Ethyl acetate | 0.4 | 0.5 | 0.3 | 0.25 | |
| Tetrahydrofurfuryl alcohol | 0.5 | 6.0 | | | |
| Water at: | | | | | |
| 25° C | 0.8 | 0.4 | | 0.05 | |
| 80° C | 10 | 0.75 | | 0.05 | |

It can be seen that only the reaction product of the benzimidazole derivative with lactic acid is soluble in any proportions in conventional solvents, water in particular.

In addition, experience has shown that the solution of the product has a fungicidal action, in particular on the Aspergillus, Penicillium Cercospora and Saccharomyces strains and may be used in particular for the protection of fruits such as citrus fruits.

What is claimed is:

1. A 2-(4′-thiazolyl)benzimidazol-lactic acid complex miscible in water and organic solvents prepared by blending up to 30% by weight of 2-(4′-thiazolyl)benzimidazole in lactic acid at a temperature between room temperature and 70° C. until a clear solution is obtained.

2. A 2-(4′-thiazolyl)benzimidazole lactic acid complex according to claim 1 wherein 1% by weight of a surfactant replaces an equal weight of lactic acid.

References Cited
UNITED STATES PATENTS 2,738,347   3/1956   Bernstein et al. _____ 260—501.1
3,017,415   1/1962   Sarett et al. _____ 260—302

OTHER REFERENCES

Fieser et al. "Organic Chemistry" (New York, 1956), page 255.

Kirk-Othmer, "Encyclopedia of Chemical Technology," vol. 8 (New York, 1952) pp. 167–169.

ALTON D. ROLLINS, Primary Examiner

U.S. Cl. X.R.

260—250 R, 286 R, 294.8 C; 424—232, 270